United States Patent
Wu et al.

(10) Patent No.: US 7,737,940 B2
(45) Date of Patent: Jun. 15, 2010

(54) TOUCH-CONTROL LIQUID CRYSTAL DISPLAY BACKGROUND OF THE INVENTION

(75) Inventors: Jeng-fang Wu, Hsin-Chu (TW); Cheng-han Tsao, Hsin-Chu (TW); Chih-wei Wang, Hsin-Chu (TW); Yen-ting Chen, Hsin-Chu (TW); Kun-hua Tsai, Hsin-Chu (TW); Yi-pai Huang, Hsin-Chu (TW); Chi-mao Hung, Hsin-Chu (TW); Ting-jui Chang, Hsin-Chu (TW); Ming-sheng Lai, Hsin-Chu (TW); Min-feng Chiang, Hsin-Chu (TW); Po-yuan Liu, Hsin-Chu (TW); Chun-ting Liu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 482 days.

(21) Appl. No.: 11/846,405

(22) Filed: Aug. 28, 2007

(65) Prior Publication Data
US 2008/0055267 A1    Mar. 6, 2008

(30) Foreign Application Priority Data
Sep. 1, 2006    (TW) .............................. 95132505 A (51) Int. Cl.
G09G 3/36    (2006.01)
(52) U.S. Cl. ..................... 345/104; 345/87; 345/92; 345/95; 345/204; 345/210
(58) Field of Classification Search ........... 345/87–104, 345/204–215, 690
See application file for complete search history.

(56) References Cited

U.S. PATENT DOCUMENTS
2004/0169625 A1    9/2004 Park et al.

(Continued)

FOREIGN PATENT DOCUMENTS
CN    1749819 A    3/2006

(Continued)

OTHER PUBLICATIONS

IDW/AD'05 AMD 10-2 Touch Panel Function Integrated LCD using LTPS Technology.

*Primary Examiner*—Vijay Shankar (57) ABSTRACT

A liquid crystal display includes a source driver, a gate driver, a plurality of pixel units, a plurality of detecting circuits, and a decision unit. Each pixel unit includes a switch transistor and a liquid crystal capacitor. When turned on by a scan signal generated by the gate driver, the switch transistor conducts a data signal voltage generated by the source driver to the liquid crystal capacitor, to adjust alignment of liquid crystal molecules. Each detecting circuit is electrically connected to one pixel unit, and includes a first transistor, a second transistor, a third transistor and a sensor unit. The first transistor conducts a constant voltage to the sensor unit when turned on, and generates a dynamic voltage when turned off. Based on the dynamic voltage, the second transistor generates a dynamic current. The third transistor conducts the dynamic current to the decision unit when turned on. The decision unit determines the position of one detecting circuit by comparing the dynamic currents output by the plurality of detecting circuits.

23 Claims, 11 Drawing Sheets

U.S. PATENT DOCUMENTS

| | | |
|---|---|---|
| 2005/0094038 A1 | 5/2005 | Choi et al. |
| 2006/0017710 A1 | 1/2006 | Lee et al. |
| 2006/0019590 A1 | 1/2006 | Ilch et al. |
| 2009/0020686 A1* | 1/2009 | Sano ........................ 250/208.1 |
| 2009/0115772 A1* | 5/2009 | Shiomi et al. ............... 345/214 |

FOREIGN PATENT DOCUMENTS

| | | |
|---|---|---|
| JP | 2001100916 | 4/2001 |
| WO | 2005043229 | 5/2005 |

\* cited by examiner

| Time Point | d (μm) | Capacitance(pf) | Voltage Difference(V) |
|---|---|---|---|
| t1 | 3 | 0.41 | 10.00 |
| t2 | 2 | 0.50 | 8.20 |
| t3 | 3 | 0.41 | 10.00 |

TOUCH-CONTROL LIQUID CRYSTAL DISPLAY BACKGROUND OF THE INVENTION

BACKGROUND OF THE INVENTION

1. Field of the Invention

The present invention relates to a liquid crystal display, and particularly relates to a touch-control liquid crystal display.

2. Description of Prior Art

More and more advanced-function displays have found their applications in current consumer electronic products. In particular, liquid crystal displays (LCDs) having a high-resolution color screen, are more widely applied in various electronic devices, such as televisions, mobile phones, personal digital assistances (PDA), digital cameras, desktop computer screens, and notebook computer screens.

To facilitate portability and usage of these devices, touch-control LCDs with an LCD touch panel to allow direct touch by the users have become the trend in the LCD market. Conventional resistor type or capacitor type LCD touch panels, which are configured by disposing additional resistors or capacitors on the panels, determine the coordinate positions of touch-points by detecting the voltage variation at the touch positions. However, since the resistors and capacitors are directly disposed on the panels, light transmittance through the LCD panel will be decreased and the overall thickness of the LCD panel will be increased. Another type of LCD touch panel, called an optical touch panel, is configured by disposing a large amount of light sources and corresponding optical detecting elements around an LCD panel. The coordinate position of a touch-point is determined when determining the position of an optical detecting element has failed to receive light rays from a corresponding light source. Although this design would not decrease the overall light transmittance through the panel, the product size is significantly increased.

Accordingly, a touch-control LCD with detecting elements incorporated into a touch panel thereof is desirable to decrease the weight and volume of the LCD and thus meets the compact demand of the LCD market.

SUMMARY OF THE INVENTION

The object of the present invention is to provide a touch-control LCD that allows direct touch by the user, the touch-control LCD having detecting elements incorporated thereinto to detect the touch points.

To achieve the above object of the present invention, a touch-control LCD in accordance with a first embodiment of the present invention includes a source driver, a gate driver, a plurality of pixel units, a plurality of detecting circuits and a decision unit. The source driver is adapted to generate a data signal voltage, and the gate driver is adapted to generate a scan signal. The plurality of pixel units is arranged in a matrix. Each pixel unit includes a switch transistor for conducting the data signal voltage when turned on by the scan signal, and a liquid crystal capacitor for adjusting the arrangement of liquid crystal molecules according to the data signal voltage. Each detecting circuit is electrically connected to one pixel unit and includes a first transistor, a sensor unit, a second transistor and a third transistor. The first transistor is adapted to conduct a constant voltage when turned on by a control signal voltage. The sensor unit, coupled to the first transistor, is adapted to generate a dynamic voltage when the first transistor is turned off. The second transistor, coupled to the sensor unit, is adapted to generate a dynamic current according to the dynamic voltage generated by the sensor unit. The third transistor, coupled to the second transistor, is adapted to conduct the dynamic current when turned on. The decision unit, coupled to the third transistor, is adapted to identify the source of dynamic currents by comparing all the dynamic currents output by the plurality of detecting circuits.

A touch-control LCD in accordance with a second embodiment of the present invention includes a source driver, a gate driver, a plurality of pixel units, a plurality of detecting circuits and a decision unit. The source driver is adapted to generate a data signal voltage, and the gate driver is adapted to generate a scan signal. The plurality of pixel units is arranged in a matrix. Each pixel unit is composed of a switch transistor for conducting the data signal voltage when turned on by the scan signal, and a liquid crystal capacitor for adjusting the arrangement of liquid crystal molecules according to the data signal voltage. Each detecting circuit is electrically connected to one pixel unit, and includes a first transistor, a second transistor and a sensor unit. The first transistor, coupled to a constant voltage terminal, is adapted to conduct a constant voltage at the constant voltage terminal when turned on by a control signal voltage. The sensor unit, coupled to the first transistor, is adapted to generate a dynamic voltage. The second transistor, coupled to the sensor unit, is adapted to generate a dynamic current according to the dynamic voltage when turned on. The decision unit, coupled to the plurality of detecting circuits, is adapted to identify the source of dynamic currents by comparing all the dynamic currents output by the plurality of detecting circuits A touch-control LCD in accordance with a third embodiment of the present invention includes a source driver, a gate driver, a plurality of pixel units, a plurality of detecting circuits and a decision unit. The source driver is adapted to generate a data signal voltage, and the gate driver is adapted to generate a scan signal. The plurality of pixel units is arranged in a matrix. Each pixel unit is composed of a switch transistor for conducting the data signal voltage when turned on by the scan signal, and a liquid crystal capacitor for adjusting the arrangement of liquid crystal molecules according to the data signal voltage. Each detecting circuit is electrically connected to one pixel unit, and includes a sensor unit, a transistor and a conversion circuit. The sensor unit is adapted to generate a dynamic voltage. The transistor is adapted to generate a dynamic current according to the dynamic voltage when turned on by a control signal voltage. The conversion circuit is adapted to convert the dynamic current into a decision voltage signal. The decision unit is adapted to identify the source of dynamic currents by comparing all the decision voltage signals output by the plurality of detecting circuits

BRIEF DESCRIPTION OF THE DRAWINGS

The present invention may best be understood through the following description with reference to the accompanying drawings, in which.

DETAILED DESCRIPTION OF THE INVENTION

Figure 1:
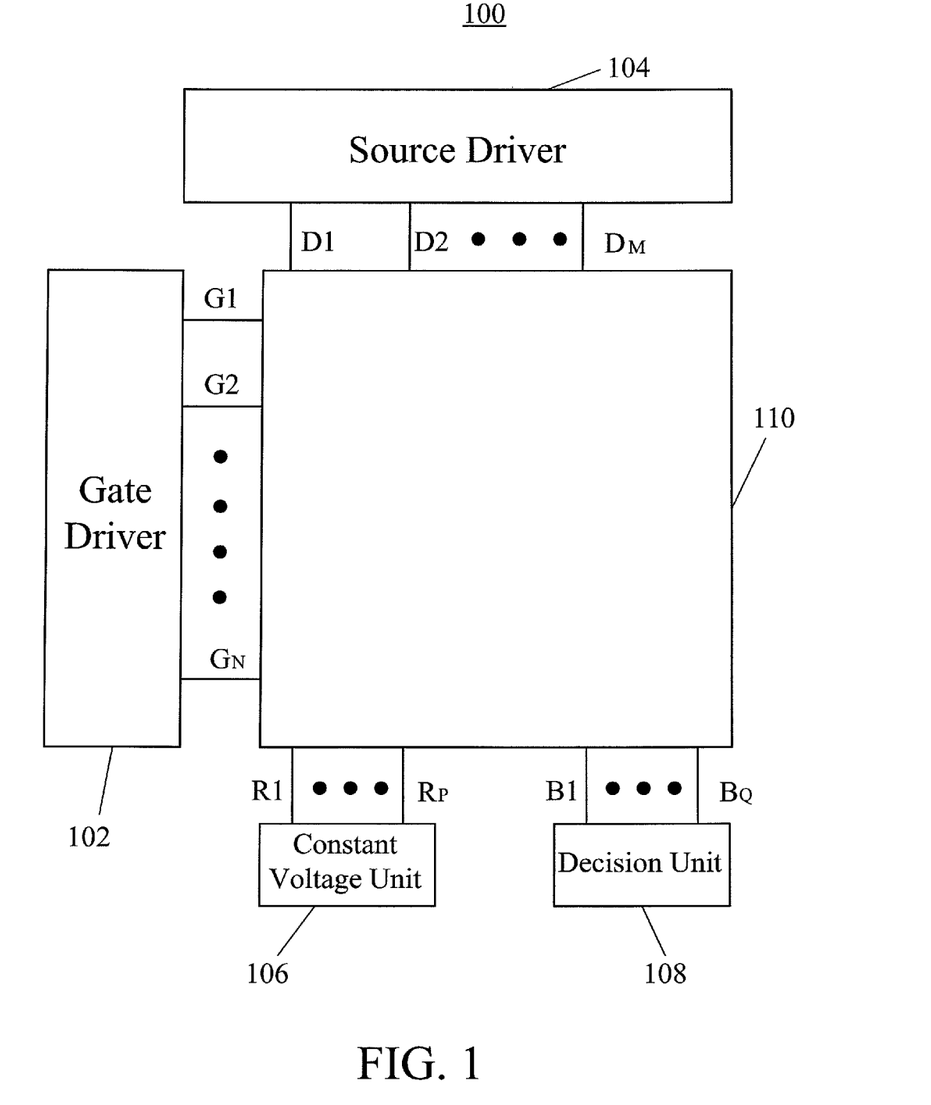
FIG. 1 is a schematic view of the configuration of a touch-control LCD in accordance with the present invention.

Referring to FIG. 1, a liquid crystal display 100 in accordance with the present invention includes a gate driver 102, a source driver 104, a constant voltage unit 106, a decision unit 108 and a liquid crystal panel 110. The gate driver 102 is adapted to generate a scan signal and then transmit the scan signal to the liquid crystal panel 110 via scan lines $G_1$-$G_N$. The source driver 104 is adapted to generate a data signal voltage and transmit the data signal voltage to the liquid crystal panel 110 via data lines $D_1$-$D_M$. The constant voltage unit 106 is adapted to generate and transmit a constant voltage to the liquid crystal panel 110 via transmission lines $R_1$-$R_P$. The decision unit 108 is coupled to the liquid crystal panel 110 by means of transmission lines $B_1$-$B_Q$, and is adapted to detect the position of a touch point on the liquid crystal panel 110.

Figure 2:
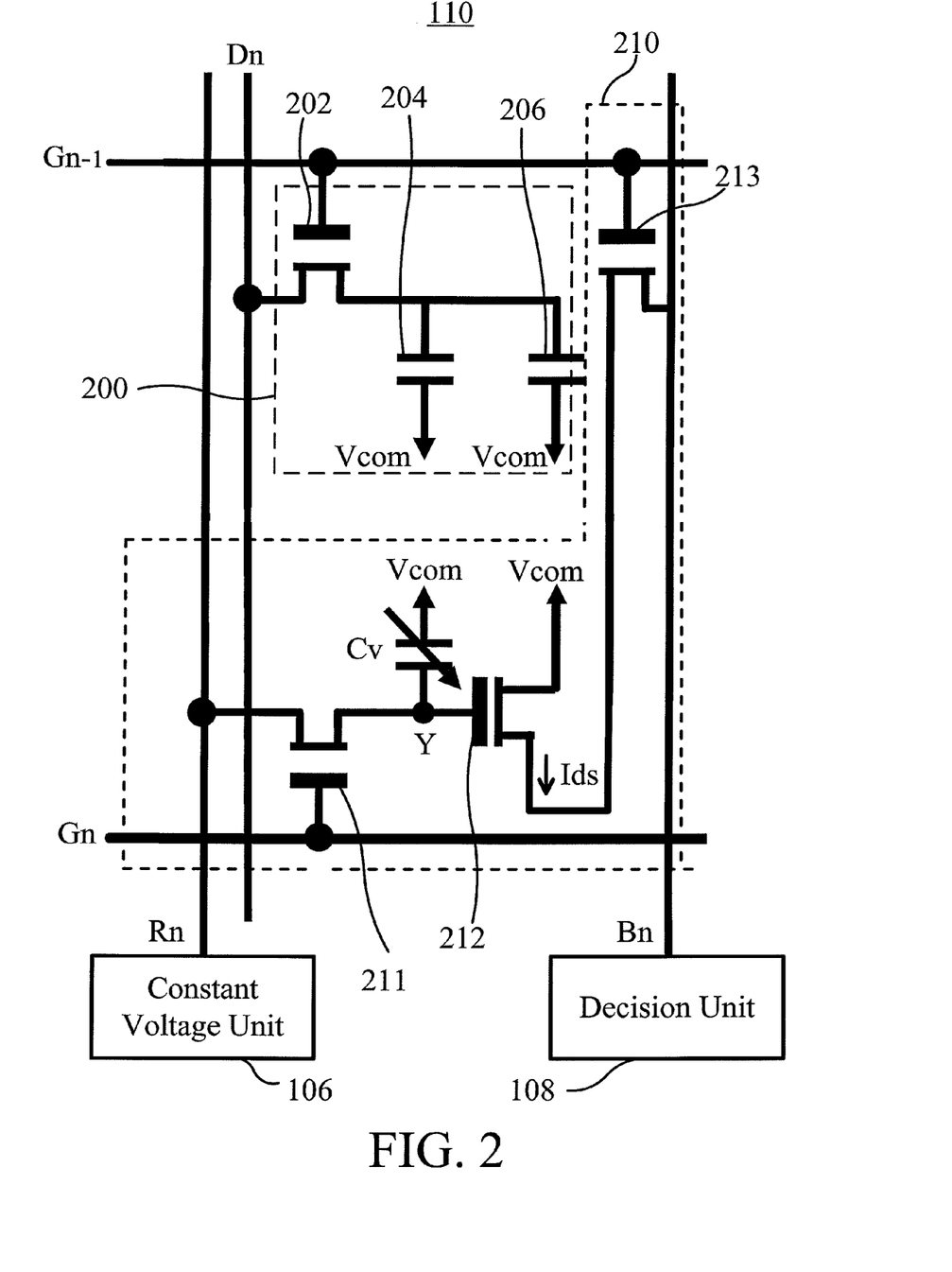
FIG. 2 is a partial circuit diagram of an LCD panel shown in FIG. 1, in accordance with a first embodiment.

Also referring to FIG. 2, which is a partial circuit diagram of the liquid crystal panel 110 as shown in FIG. 1 according to a first embodiment, the liquid crystal panel 110 includes a plurality of pixel units 200 and a plurality of detecting circuits 210 coupled to corresponding pixel units 200. However, it should be understood that the number of the detecting circuits 210 may be less than or equal to the number of the pixel units 200, and the detecting circuits 210 are uniformly arranged on the liquid crystal panel 110. Each pixel unit 200 includes a switch transistor 202, a storage capacitor 204 and a liquid crystal capacitor 206. The liquid crystal capacitor 206 is consisted of two electrodes, one of which is connected to a common voltage end Vcom, and the other of which is connected to the switch transistor 202. Liquid crystal molecules are arranged between the two electrodes. When the gate of the switch transistor 202 receives a scan signal generated by the gate driver 102 from the scan line $G_{n-1}$, the data signal voltage generated by the source driver 104 is conducted to the liquid crystal capacitor 206 through the data line Dn. According to the voltage difference between the common voltage at the common voltage end Vcom and the data signal voltage, the liquid crystal molecules of the liquid crystal capacitor 206 are reoriented for controlling the light intensity transmitted through the liquid crystal molecules. The storage capacitor 204 is adapted to store the data signal voltage, so that the liquid crystal capacitor 206 may still maintain the voltage difference between the data signal voltage and the common voltage even when the switch transistor 202 is turned off, thereby maintaining the light intensity transmitted through the liquid crystal molecules. The detecting circuit 210 includes a first transistor 211, a second transistor 212, a third transistor 213 and a sensor unit. The sensor unit is adapted to generate a dynamic voltage at node Y in a predetermined time period. In a preferred embodiment, the sensor unit is in the form of a touch capacitor Cv, which transmits a dynamic voltage to the node Y based on its dynamic capacitance variations in the predetermined time period.

Figure 3:
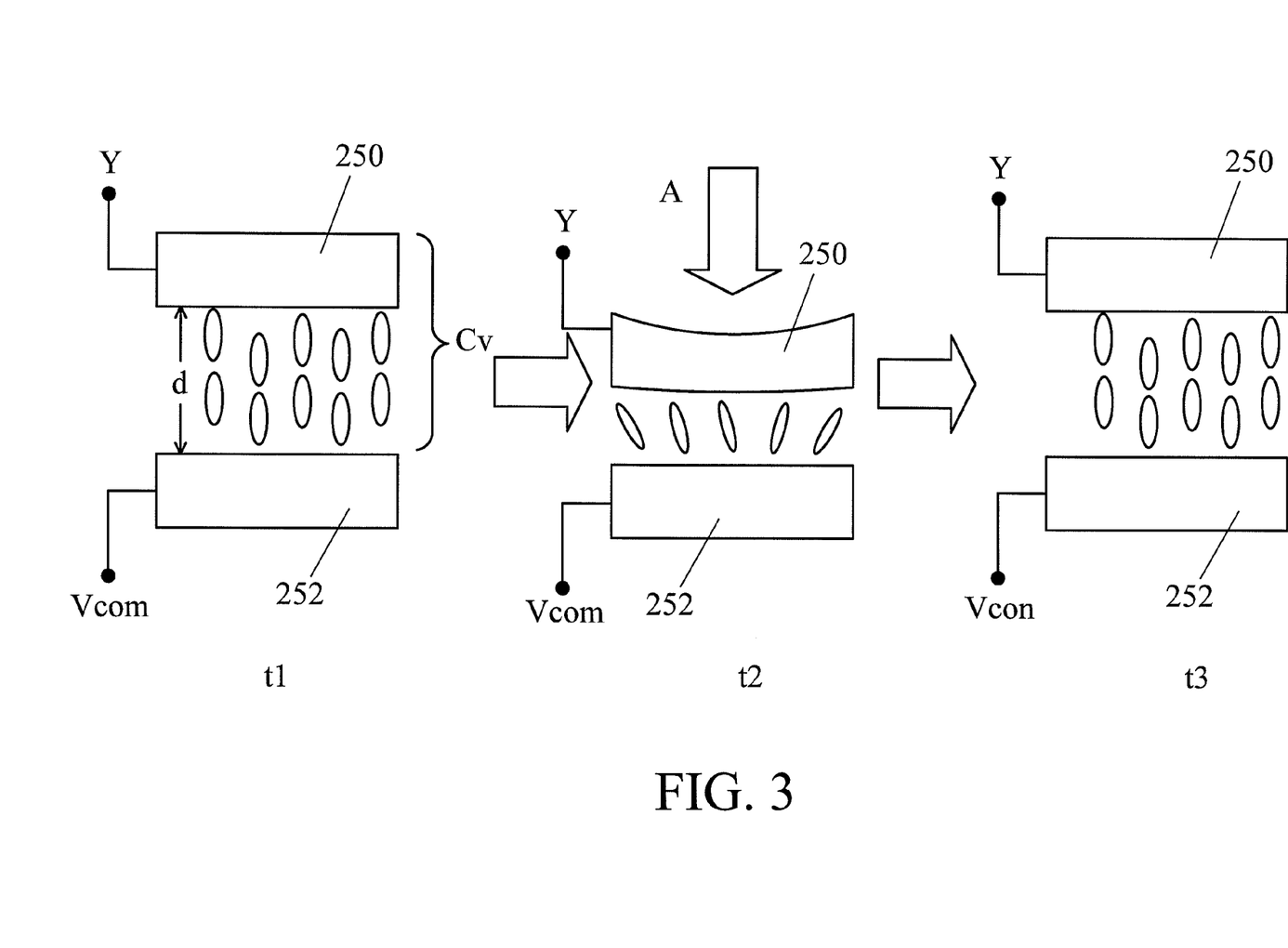
FIG. 3 is a schematic view illustrating the status of a sensor unit shown in FIG. 2 when an external force is exerted thereon.
Figure 4:
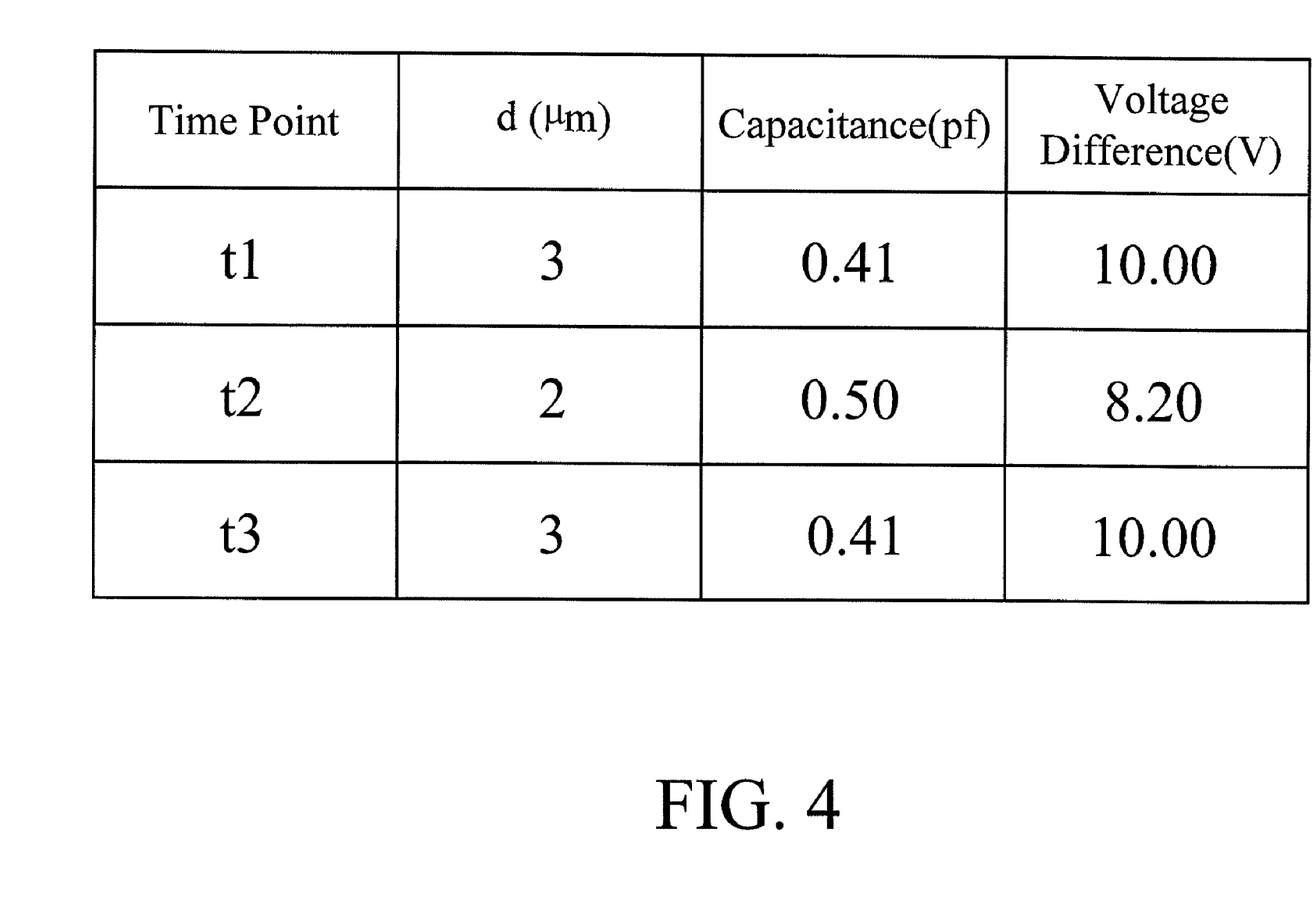
FIG. 4 is a form showing the relationship between the voltage and capacitance values of a touch capacitor shown in FIG. 3 at different time points.

Please refer to FIGS. 3 and 4 in conjunction with FIG. 2. FIG. 3 is a schematic view illustrating the status of the sensor unit in FIG. 2 when an external force is exerted thereon. FIG. 4 is a form showing the relationship between the voltage and capacitance of the touch capacitor Cv of FIG. 3 at different time points. As described above, the sensor unit may be in the form of a touch capacitor Cv. In the preferred embodiment, the touch capacitor Cv is disposed on the liquid crystal panel 110, that is, on the two conductive glass substrates 250, 252 of the liquid crystal panel 110. One terminal of the touch capacitor Cv is electrically connected with the first transistor 211 (i.e., node Y), and the other terminal is electrically connected to a constant voltage terminal to provide a constant voltage. In the preferred embodiment, the constant voltage terminal and the liquid crystal capacitor 206 share the common voltage end Vcom. As shown in FIG. 4, for example, at time point t1, when the liquid crystal panel 110 is not touched by the user's finger and the voltage difference between the two conductive glass substrates 250, 252 is 10V, the distance "d" between the two electrodes of the touch capacitor Cv is 3 μm and the capacitance of the touch capacitor Cv is 0.41 pf. At time point t2, when an external force A is exerted on the conductive glass substrate 250 of the liquid crystal panel 110 by the user's finger or a touch pen, the distance "d" between the two electrodes of the touch capacitor Cv is decreased to be 2 μm and the arrangement of the liquid crystal molecules between the two electrodes is correspondingly changed. Since the capacitance of the touch capacitor Cv is found to be in reverse proportion to the distance "d" and is correlated to the liquid crystal molecule arrangement, the capacitance of the touch capacitor Cv is increased to be 0.50 pf at time point t2. At the same time, as the charge Q stored by the touch capacitor Cv is a constant value, the voltage difference between the two conductive glass substrates 250, 252 is decreased to be 8.2V (8.2>0.5=10>0.41). At time point t3, when the external force A is released, the distance "d" between the two electrodes of the touch capacitor Cv is restored to be 3 μm, the capacitance of the touch capacitor Cv is restored to be 0.41 pf, and the voltage difference between the two conductive glass substrates 250, 252 is also restored to be 10V.

Figure 5:
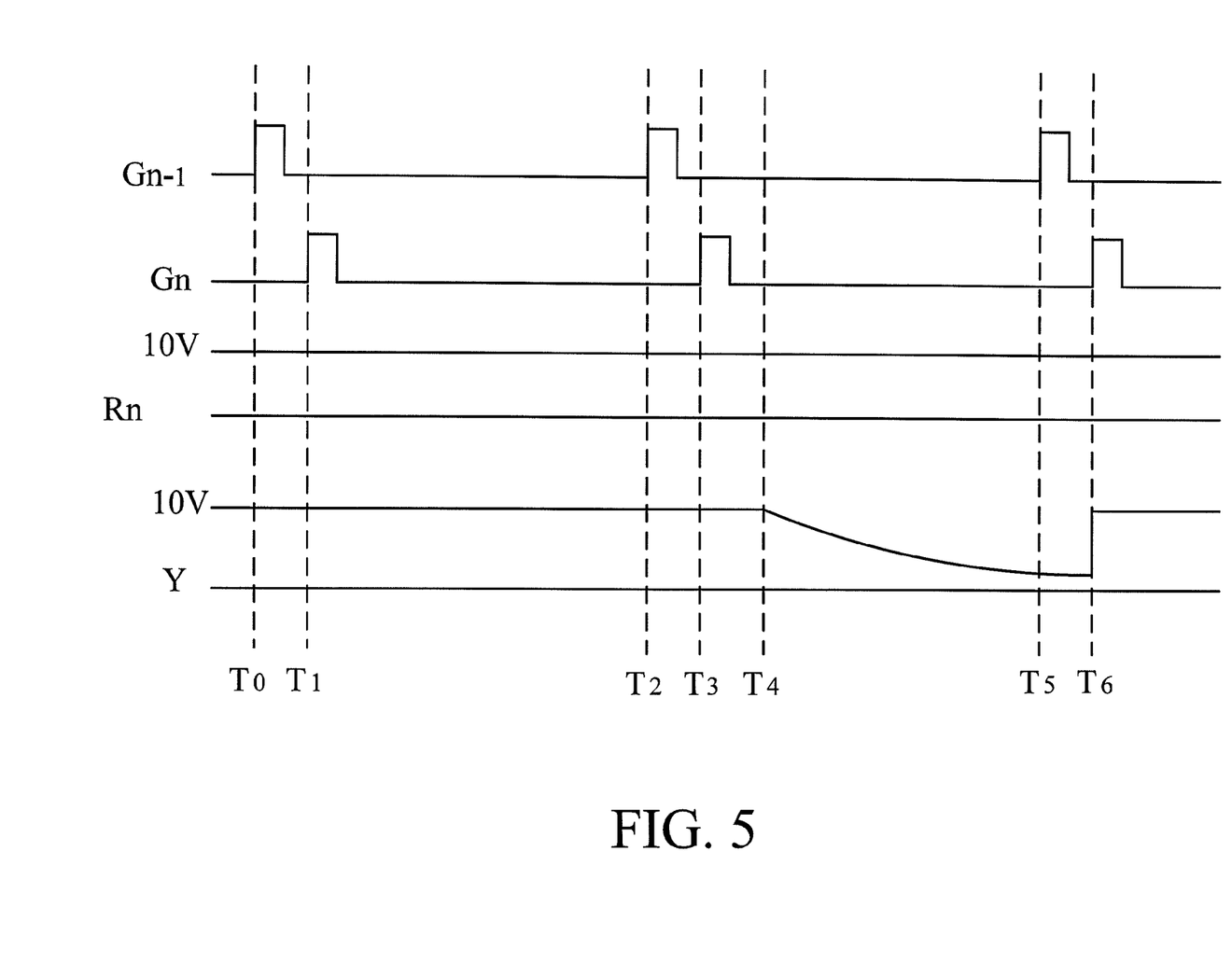
FIG. 5 is a sequence diagram of the signal lines in FIG. 2.

Please refer to FIG. 5 in conjunction with FIG. 2. FIG. 5 is a sequence diagram of the signal lines in FIG. 2. At time point T0, the scan signal generated by the gate driver 102 turns on the switch transistor 202 via the scan line Gn−1, and the data signal voltage generated by the source driver 104 is delivered to the liquid crystal capacitor 206 via the data line Dn and the switch transistor 202. At time point T1, the scan signal generated by the gate driver 102 turns on the first transistor 211 via the scan line Gn and the switch transistor 202, and the transmission line Rn delivers a constant voltage (10V) to the node Y through the first transistor 211. At this time, the touch capacitor Cv (i.e., the sensor unit) stores this constant voltage, and maintains the voltage Vy at the node Y to be 10V until the first transistor 211 is turned on again by a scan signal transmitted via the scan line Gn. During the time period T2-T3, as the gate terminal of the second transistor 212 is electrically connected with the node Y, the constant voltage will turn on the second transistor 212, whereby a current Ids is generated by the second transistor 212 according to the voltage Vy. The current Ids is determined by the following Equation 1:

$$Ids = K\left[(V_g - V_{th})V_d - \frac{1}{2}V_d^2\right] \quad \text{(Equation 1)}$$

where, K represents a constant, Vth represents the threshold voltage of the capacitor, Vg represents the gate voltage of the capacitor, and Vd represents the drain voltage of the capacitor. At time point T2, the scan signal generated by the gate driver 102 turns on both the switch transistor 202 and the third transistor 213 via the scan line Gn−1. At this time, the gate voltage of the second transistor 212, i.e., the voltage at the node Y, is 10V, and the drain voltage of the second transistor 212 is a common voltage provided by the common voltage end Vcom. Thus, the current Ids is maintained to be a constant value, and is conducted to the transmission line Bn for reception by the decision unit 108 via the third transistor 213 that has been turned on.

Figure 6:
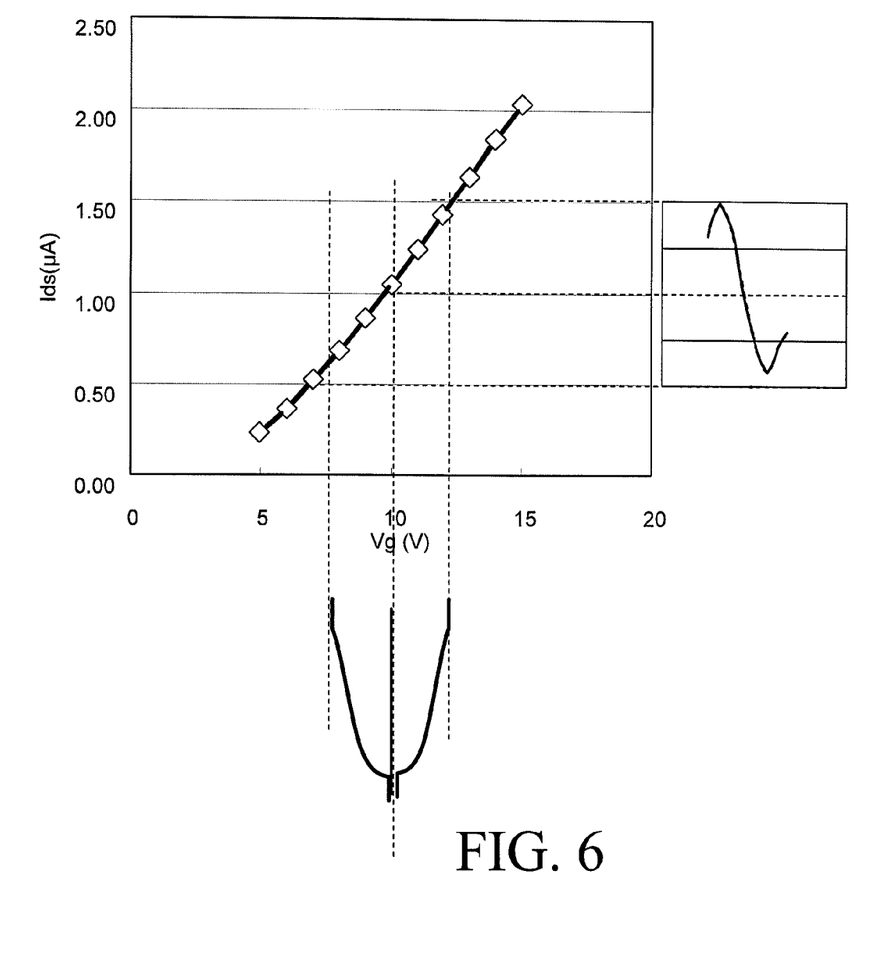
FIG. 6 is a graph showing the relationship between the conducted current Ids and the gate voltage Vg.

At time point T3, the scan signal from the scan line Gn turns on the first transistor 211 for a second time, and maintains the voltage at the node Y to be 10V according to the constant voltage provided by the constant voltage unit 106. At time point T4, as shown in FIGS. 3 and 4, the capacitance of the touch capacitor Cv is increased due to the external force, and thus the voltage Vy at the node Y is correspondingly decreased. Consequently, the conducted current Ids of the second transistor 212 is decreased along with the decrease of the voltage Vy, which can be explained by the above Equation 1. FIG. 6 is a graph showing the relationship between the conducted current Ids and the gate voltage Vg of the capacitor. At time point T5, the scan signal transmitted by the scan line Gn−1 turns on the third transistor 213 again, whereby the conducted current Ids is delivered to the decision unit 108 via the transmission line Bn.

Figure 7:
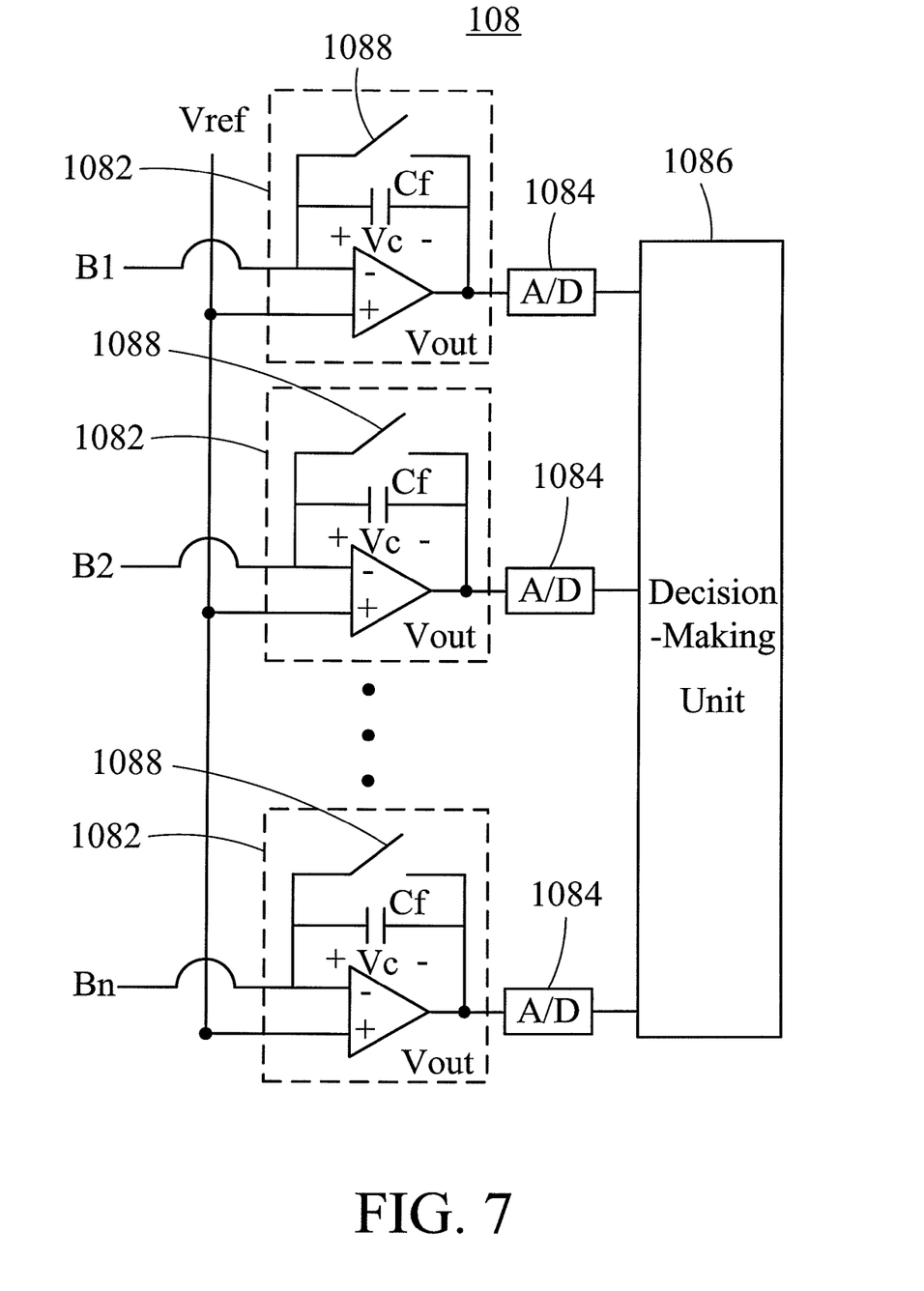
FIG. 7 is a circuit diagram of a decision unit shown in FIG. 2.

FIG. 7 is a circuit diagram of the decision unit 108 shown in FIG. 2. The decision unit includes a plurality of integrating circuits 1082, a plurality of analog-to-digital converters 1084 and a decision-making unit 1086. Each integrating circuit 1082 is coupled to a transmission line Bn, and has a switch unit 1088. When the switch unit 1088 is in a turn-off state, the output voltage Vout of the integrating circuit 1082 satisfies the following Equation 2:

$$Vout = -Vc = -\frac{Ids \times t}{Cf} \quad \text{(Equation 2)}$$

That is, according to the output voltage Vout of the integrating circuit 1082, the current Ids variations during the T5-T6 time period can be calculated, and the result is outputted to the analog-to-digital converter 1084. The analog-to-digital converter 1084 outputs a decision signal to the decision-making unit 1086 according to whether the output voltage Vout value is larger than a predetermined value. The decision-making unit 1086 then receives the outputs of the plurality of the analog-to-digital converters 1084, determines which detecting circuits 210 are touched, and accordingly determines corresponding coordinate positions of the touched detecting circuits 210 on the liquid crystal panel 110.

As the amount of the external force exerted on the touch capacitor Cv varies for different users, the capacitance of the touch capacitor Cv correspondingly varies with the variations of the external force, and the current Ids output by the second transistor 212 of the detecting circuit 210 also varies. Thus, the amount of the external force can be calculated according to the output voltage Vout of each integrating circuit 1082. Accordingly, the integrating circuits 1082 may be directly connected to the decision-making unit 1086. According to the output voltages Vout of the plurality of the integrating circuits 1082, the decision-making unit 1086 may determine the corresponding coordinate position of the touch point and the amount of the external force exerted at this coordinate position.

It should be noted that, as shown in FIG. 2, the gate terminal of the first transistor 211 and the scan line Gn are coupled to each other at node CTRL, which indicates that the cycle of voltage variation output by the detection and sensor unit of each detecting circuit coincides with the scanning frequency of the liquid crystal display. For example, when the scanning frequency of the liquid crystal display is 60 Hz, the detection interval of each detecting circuit is about 16.67 ms (1/60). In an alternative embodiment, the gate terminals of the first and third transistors 211, 213 may be respectively coupled to a control signal generator (not shown). The detection interval of the detecting circuit may be set to be 100 ms or other cycles. That is, the control signal generator generates a control signal voltage every 100 ms and delivers it to the gate terminals of the first and third transistors 211, 213.

Figure 8:
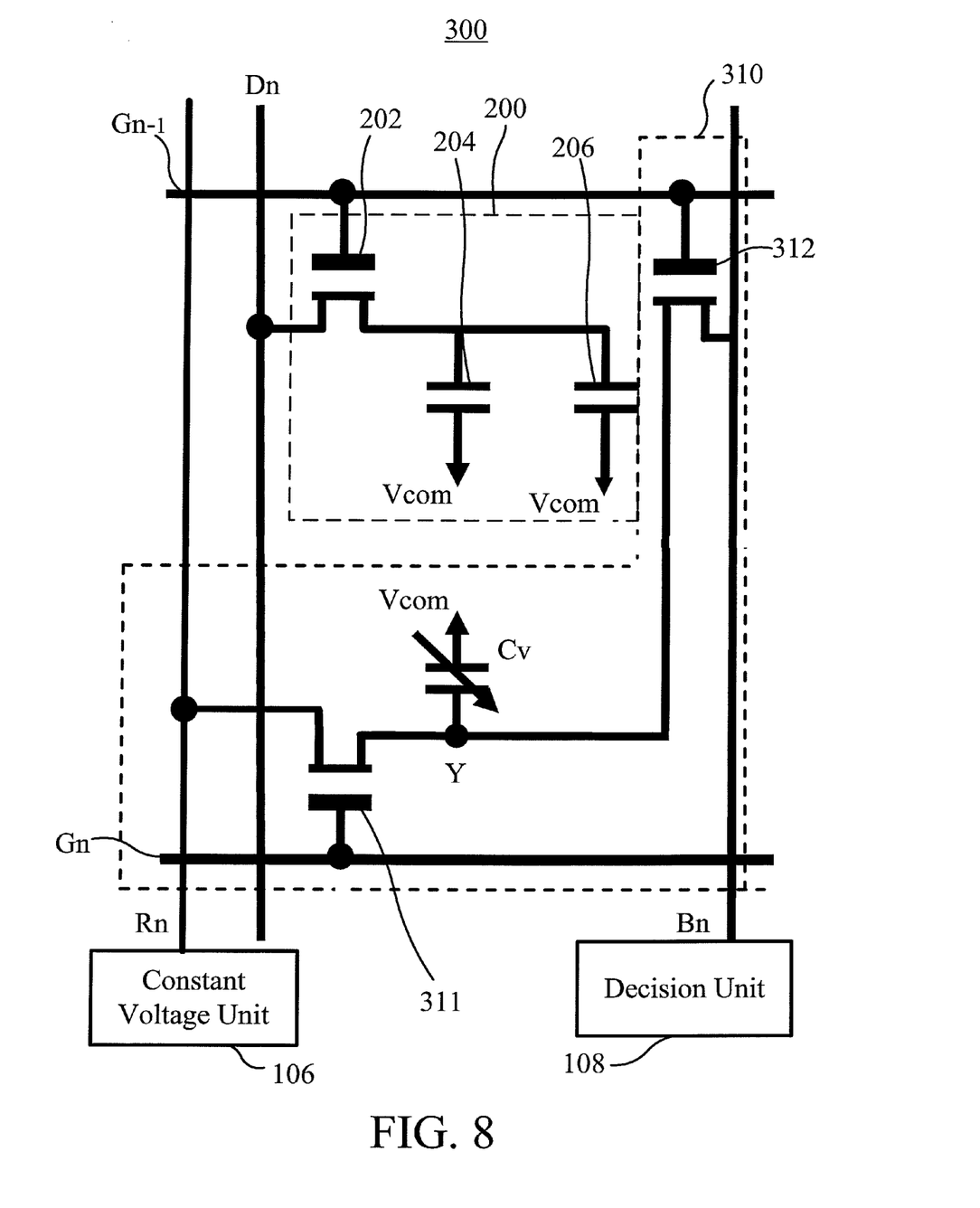
FIG. 8 is a partial circuit diagram of the liquid crystal panel as shown in FIG. 1 according to a second embodiment.

FIG. 8 is a partial circuit diagram of the liquid crystal panel as shown in FIG. 1 according to a second embodiment. In this embodiment, the liquid crystal panel 300 includes a plurality of pixel units 200 and a plurality of detecting circuits 310 coupled to corresponding pixel units 200. However, it should be understood that the number of the detecting circuits 310 may be smaller than or equal to the number of the pixel units 200, and the detecting circuits 310 are uniformly arranged on the liquid crystal panel 300. Each pixel unit 200 includes a switch transistor 202, a storage capacitor 204 and a liquid crystal capacitor 206. Since the operating principle of the pixel unit 200 is the same as that described in the first embodiment in connection with FIG. 2, a detailed description thereof is thus omitted herein. The detecting circuit 310 includes a first transistor 311, a second transistor 312 and a sensor unit. The sensor unit is adapted to generate a dynamic voltage at node Y in a predetermined time period. In this embodiment, the sensor unit is in the form of a touch capacitor Cv, which transmits a dynamic voltage to the node Y based on its dynamic capacitance variations in the predetermined time period. Since the operating principle of the touch capacitor Cv has been described in the first embodiment in connection with FIGS. 3 and 4, a detailed description thereof is also omitted herein.

Figure 9:
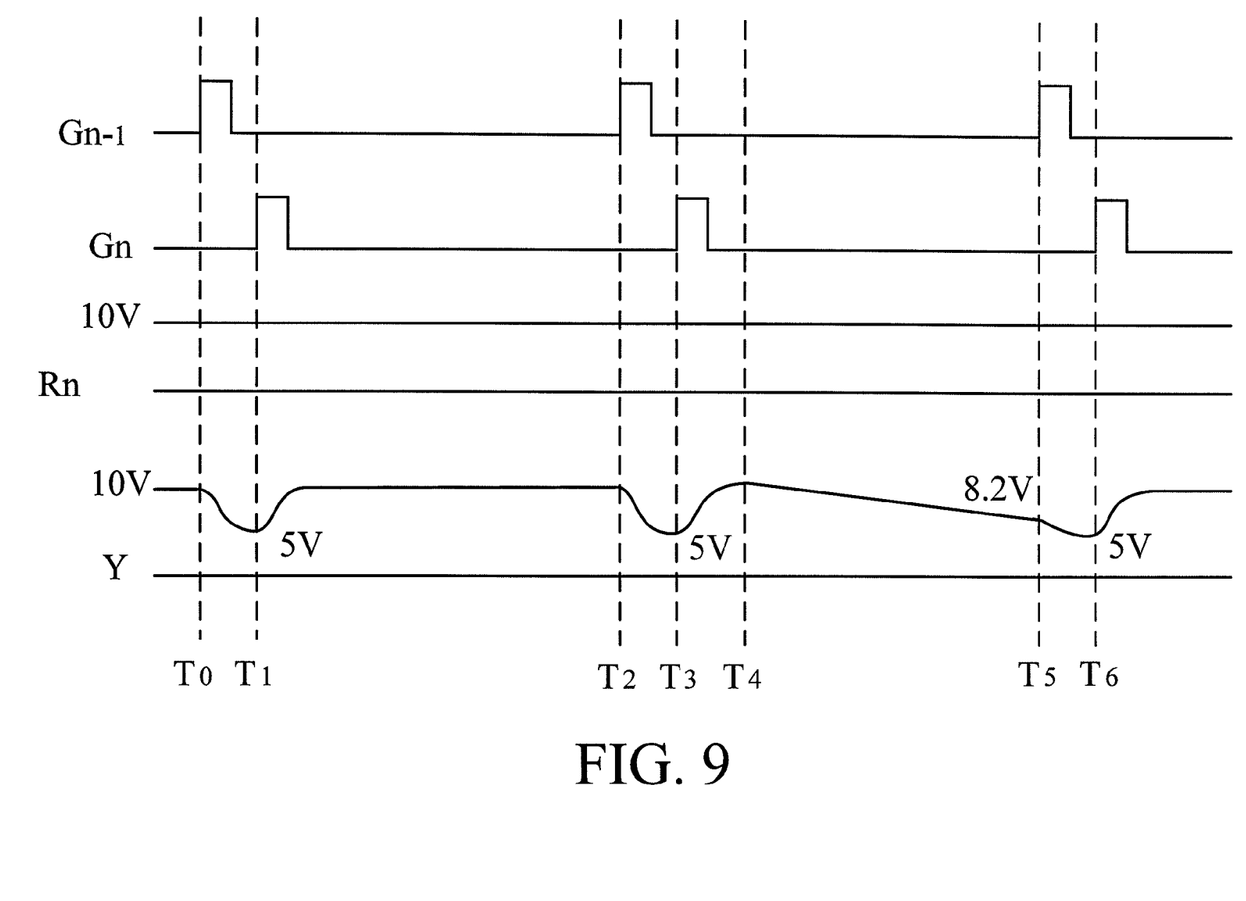
FIG. 9 is a sequence diagram of the signal lines in FIG. 8.

Please refer to FIG. 9 in conjunction with FIG. 8. FIG. 9 is a sequence diagram of the signal lines in FIG. 8. At time point T0, the scan signal generated by the gate driver 102 turns on the switch transistor 202 via the scan line Gn−1, and the data signal voltage generated by the source driver 104 is delivered to the liquid crystal capacitor 206 via the data line Dn and the switch transistor 202. At time point T1, the scan signal generated by the gate driver 102 turns on the first transistor 311 via the scan line Gn and the switch transistor 202, and the transmission line Rn delivers a constant voltage (10V) to the node Y through the first transistor 311. At this time, the touch capacitor Cv (i.e., the sensor unit) stores this constant voltage, and maintains the voltage Vy at the node Y to be 10V until the first transistor 311 is turned on again by a scan signal transmitted via the scan line Gn. During the time period T2-T3, as both the gate terminal of the second transistor 312 and the gate terminal of the switch transistor 202 are electrically connected with the scan line Gn−1, the constant voltage will turn on the second transistor 312, whereby a current Ids is generated by the second transistor 312 according to the voltage Vy. As indicated in Equation 1, the current Ids is correlated with the voltage Vy at node Y. When the voltage Vy at node Y is maintained to be 10V, the current Ids will also be a constant value. At time point T2, the scan signal generated by the gate driver 102 turns on both the switch transistor 202 and the second transistor 312 via the scan line Gn−1. The turned-on second transistor 312 then conducts the current Ids to the transmission line Bn for reception by the decision unit 108.

At time point T3, the scan signal from the scan line Gn turns on the first transistor 311 for a second time, and maintains the voltage at the node Y to be 10V. At time point T4, as shown in FIGS. 3 and 4, the capacitance of the touch capacitor Cv is increased due to the external force, and thus the voltage Vy at the node Y is correspondingly decreased. Consequently, the conducted current Ids of the second transistor varies with the variations of the voltage Vy, which can be explained by Equation 1. At time point T5, the scan signal transmitted by the scan line Gn−1 turns on the second transistor 312 again, whereby the conducted current Ids is delivered to the decision unit 108 via the transmission line Bn.

Finally, as shown in FIG. 7, the decision unit 108 determines which detecting circuits 310 are touched according to the amount of the conducted current Ids, and then determines corresponding coordinate positions of the touched detecting circuits 310 on the liquid crystal panel 300.

In an alternative embodiment, the gate terminals of the first and second transistors 311, 312 may be respectively coupled to a control signal generator (not shown). The detection interval of the detecting circuit may be set to be 100 ms or other cycles. That is, the control signal generator generates a control signal voltage every 100 ms and delivers it to the gate terminals of the first and second transistors 311, 312.

Figure 10:
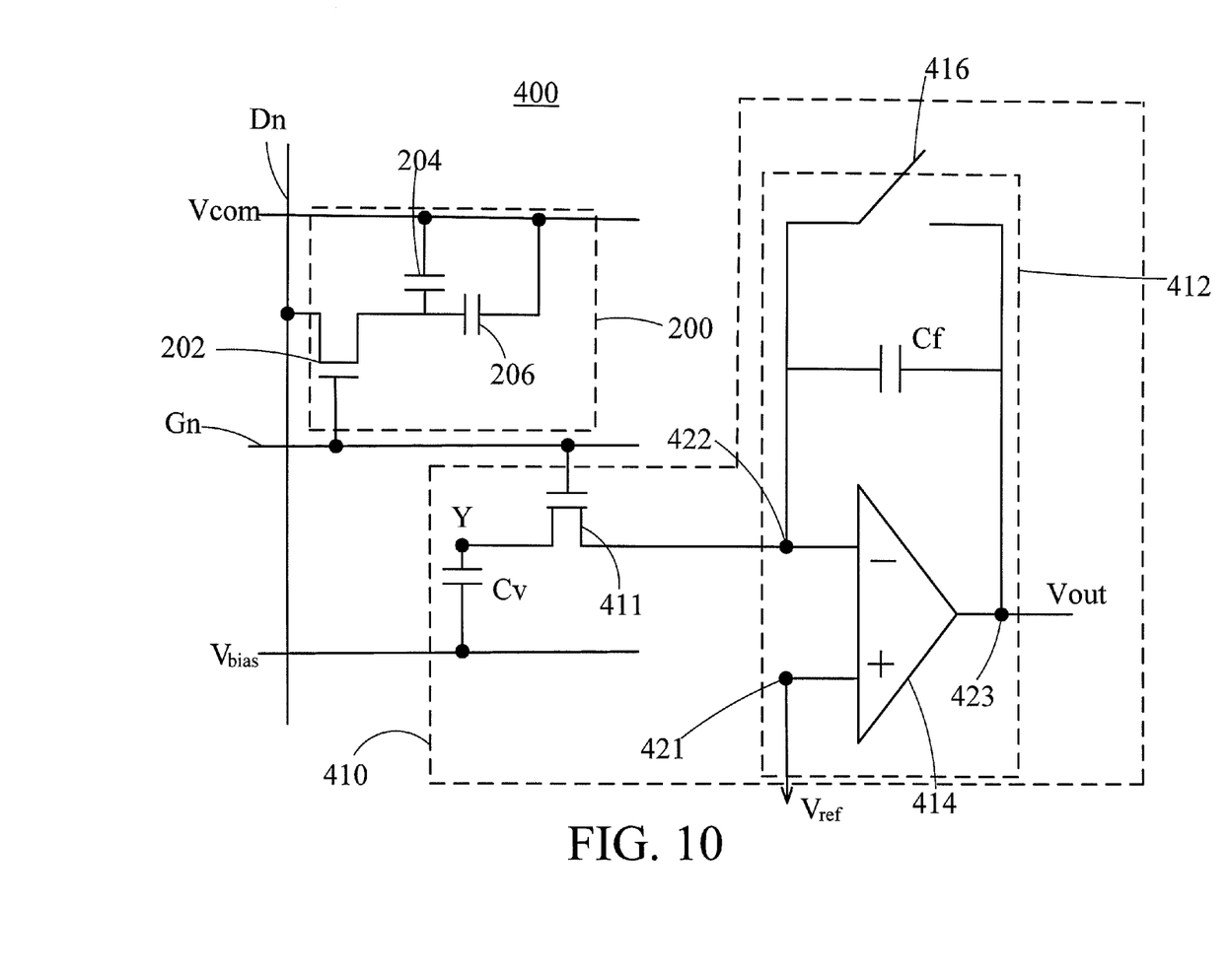
FIG. 10 is a partial circuit diagram of the liquid crystal panel according to a third embodiment.

FIG. 10 is a partial circuit diagram of the liquid crystal panel according to a third embodiment. In this embodiment, the liquid crystal panel 400 includes a plurality of pixel units 200 and a plurality of detecting circuits 410 coupled to corresponding pixel units 200. However, it should be understood that the number of the detecting circuits 410 may be smaller than or equal to the number of the pixel units 200, and the detecting circuits 410 are uniformly arranged on the liquid crystal panel 400. Each pixel unit 200 includes a switch transistor 202, a storage capacitor 204 and a liquid crystal capacitor 206. Since the operating principle of the pixel unit 200 is the same as that described in the first embodiment in conjunction with FIG. 2, a detailed description thereof is thus omitted herein. The detecting circuit 410 includes a transistor 411, a conversion circuit 412 and a sensor unit. The conversion circuit 412 includes an operational amplifier 414, a feedback capacitor Cf and a switch unit 416. The operational amplifier 414 has a first input terminal 421, a second input terminal 422 and an output terminal 423. The first input terminal 421 is coupled to a reference voltage terminal Vref that is adapted to provide a direct current reference voltage. For facilitating understanding in this embodiment, the reference voltage is 5V. The conversion circuit 412 may be regarded as an integrating circuit. When the scan line Gn delivers a scan signal, the switch unit 416 will be turned off. In contrast, when the scan line Gn does not deliver a scan signal, the switch unit 416 will be turned on, whereby a short circuit occurs between the second input terminal 422 and the output terminal 423. The sensor unit is adapted to generate a dynamic voltage at node Y in a predetermined time period. In this embodiment, the sensor unit is in the form of a touch capacitor Cv, which transmits a dynamic voltage to the node Y based on its dynamic capacitance variations in the predetermined time period. Since the operating principle of the touch capacitor Cv has been described in the first embodiment in connection with FIGS. 3 and 4, a detailed description thereof is also omitted herein.

Figure 11:
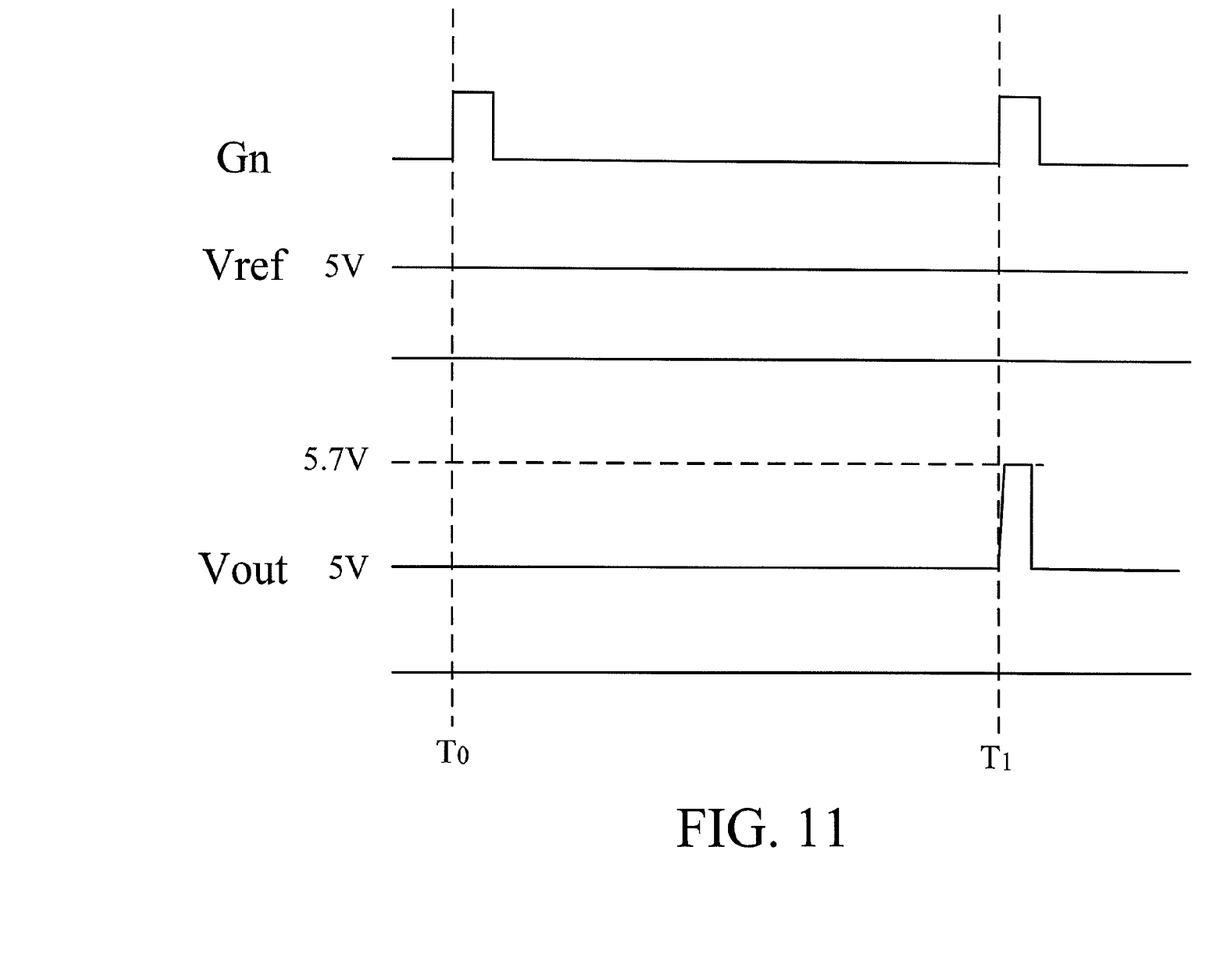
FIG. 11 is a sequence diagram of the signal lines in FIG. 10.

Please refer to FIG. 11 in conjunction with FIG. 10. FIG. 11 is a sequence diagram of the signal lines in FIG. 10. At time point T0, the scan signal generated by the gate driver 102 turns on the switch transistor 202 via the scan line Gn. The data signal voltage generated by the source driver 104 is delivered to the liquid crystal capacitor 206 via the data line Dn and the switch transistor 202. The scan signal generated by the gate driver 102 turns on the transistor 411 via the scan line Gn, whereby the potential at the node Y is equal to the potential at the second input terminal 422 of the operational amplifier 414 (i.e., the reference voltage Vref=5V). Because the switch unit 416 is in a turned-on state at this time, the voltage at the output terminal 423 of the operational amplifier 414 is also 5V.

During the time period T0-T1, as shown in FIGS. 3 and 4, the capacitance of the touch capacitor Cv is increased due to the external force, and thus the voltage Vy at the node Y is correspondingly decreased. Consequently, the conducted current Ids of the transistor 411 varies with the variations of the voltage Vy, which can be explained by Equation 1. At time point T1, the scan signal transmitted by the scan line Gn turns on the transistor 411 again, whereby the conducted current Ids charges the feedback capacitor Cf and the voltage Vout at the output terminal 423 of the operational amplifier 414 increases. Accordingly, the decision unit (not shown in FIG. 10) may determine which detecting circuits 410 are touched according to the amount of the voltage Vout output by each detecting circuit 410, and accordingly determines corresponding coordinate positions of the touched detecting circuits 410 on the liquid crystal panel 400.

The present liquid crystal display integrates a plurality of sensor units into a liquid crystal panel thereof, and provides a plurality of detecting circuits for detecting the voltage variations of each sensor unit. According to these voltage variations, corresponding coordinate positions of the touch control capacitors that have been touched can be determined. Since the sensor units are integrated into the liquid crystal panel, not only the weight and size of the liquid crystal display are decreased, but also the current compact trend of liquid crystal display products is matched as well.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display, comprising:
   a source driver generating a data signal voltage;
   a gate driver generating a scan signal;
   a plurality of pixel units arranged in a matrix, each pixel unit comprising a switch transistor for conducting the data signal voltage when turned on by the scan signal, and a liquid crystal capacitor having one end coupled to the switch transistor and the other end coupled to a common voltage end, the liquid crystal capacitor adjusting the arrangement of liquid crystal molecules disposed therein according to the data signal voltage;
   a plurality of detecting circuits, each electrically connected to one pixel unit, each detecting circuit comprising:
      a first transistor coupled to a constant voltage terminal and conducting a predetermined constant voltage from the constant voltage terminal when turned on by a control signal;
      a sensor unit coupled to the first transistor for generating a dynamic voltage;
      a second transistor coupled to the sensor unit for generating a dynamic current according to the dynamic voltage; and
      a third transistor coupled to the second transistor for conducting the dynamic current when turned on; and a decision unit coupled to the plurality of detecting circuits for determining the source of the dynamic currents by comparing all the dynamic currents output by the plurality of detecting circuits.

2. The liquid crystal display as claimed in claim 1, wherein the sensor unit is a variable capacitor.

3. The liquid crystal display as claimed in claim 2, wherein the variable capacitor generates a corresponding dynamic voltage according to its capacitance variation.

4. The liquid crystal display as claimed in claim 3, wherein terminals of the variable capacitor are respectively coupled to the first transistor and the common voltage end.

5. The liquid crystal display as claimed in claim 1, wherein the control signal is a scan signal exerted on the next array of pixel units by the gate driver.

6. The liquid crystal display as claimed in claim 1, further comprising a control signal generator, the control signal generator being coupled to a control terminal of the first transistor for generating and transmitting the control signal to the first transistor.

7. The liquid crystal display as claimed in claim 1, wherein the second transistor has a first terminal coupled to a second terminal of the third transistor, a second terminal coupled to the common voltage end, and a control terminal coupled to the sensor unit.

8. The liquid crystal display as claimed in claim 7, wherein the decision unit comprises a plurality of integrating circuits each for outputting a voltage according to the dynamic current, and a decision-making unit for comparing the output voltages of the integrating circuits and thus determining the source of the dynamic currents.

9. The liquid crystal display as claimed in claim 1, wherein the third transistor has a control terminal coupled to a control terminal of the switch transistor.

10. A liquid crystal display, comprising:
a source driver generating a data signal voltage;
a gate driver generating a scan signal;
a plurality of pixel units arranged in a matrix, each pixel unit comprising a switch transistor for conducting the data signal voltage when turned on by the scan signal, and a liquid crystal capacitor adjusting the arrangement of a plurality of liquid crystal molecules according to the data signal voltage;
a plurality of detecting circuits each electrically connected to one pixel unit, each detecting circuit including a first transistor coupled to a constant voltage terminal and conducting a constant voltage from the constant voltage terminal when turned on by a control signal voltage, a sensor unit coupled to the first transistor for generating a dynamic voltage, and a second transistor coupled to the sensor unit for generating a dynamic current according to the dynamic voltage when turned on; and
a decision unit coupled to the plurality of detecting circuits for determining the source of the dynamic currents by comparing all the dynamic currents outputted by the plurality of detecting circuits.

11. The liquid crystal display as claimed in claim 10, wherein the sensor unit is a variable capacitor.

12. The liquid crystal display as claimed in claim 11, wherein the variable capacitor generates a dynamic voltage according to capacitance variation of the variable capacitor.

13. The liquid crystal display as claimed in claim 12, wherein both terminals of the variable capacitor are respectively coupled to the first transistor and the common voltage end.

14. The liquid crystal display as claimed in claim 10, wherein the control signal voltage is a scan signal exerted on the next array of pixel units by the gate driver.

15. The liquid crystal display as claimed in claim 10, further comprising a control signal generator, the control signal generator being coupled to a control terminal of the first transistor for generating and transmitting the control signal voltage to the first transistor.

16. The liquid crystal display as claimed in claim 10, wherein the second transistor has a first terminal coupled to the decision unit, a second terminal coupled to the sensor unit and the first transistor, and a control terminal coupled to the switch transistor.

17. The liquid crystal display as claimed in claim 10, wherein the decision unit comprises a plurality of integrating circuits each for outputting a voltage according to the dynamic current, and a decision-making unit for comparing the output voltages of the integrating circuits and thus determining the source of the dynamic currents.

18. A liquid crystal display, comprising:
a source driver generating a data signal voltage;
a gate driver generating a scan signal;
a plurality of pixel units arranged in a matrix, each pixel unit comprising a switch transistor for conducting the data signal voltage when turned on by the scan signal, and a liquid crystal capacitor adjusting the arrangement of a plurality of liquid crystal molecules according to the data signal voltage;
a plurality of detecting circuits each electrically connected to one pixel unit, each detecting circuit comprising:
a sensor unit for generating a dynamic voltage, a transistor for generating a dynamic current according to the dynamic voltage when turned on by a control signal voltage; and
a conversion circuit for converting the dynamic current into a decision voltage signal; and
a decision-making unit determining the position of one of the plurality of detecting circuits by comparing the decision voltage signals output by the plurality of detecting circuits.

19. The liquid crystal display as claimed in claim 18, wherein the sensor unit is a variable capacitor.

20. The liquid crystal display as claimed in claim 19, wherein the variable capacitor generates a dynamic voltage according to capacitance variation of the variable capacitor.

21. The liquid crystal display as claimed in claim 20, wherein both terminals of the variable capacitor are respectively coupled to the transistor and the common voltage end.

22. The liquid crystal display as claimed in claim 18, wherein the transistor has a control terminal coupled to a control terminal of the switch transistor.

23. The liquid crystal display as claimed in claim 18, wherein the conversion circuit comprises:
an operational amplifier having a first input terminal coupled to a constant voltage terminal, a second input terminal and an output terminal;
a switch unit coupled between the second input terminal and the output terminal of the operational amplifier; and
a feedback capacitor coupled to the transistor for converting the dynamic current into the decision voltage signal when the switch unit is turned on.

* * * * *

UNITED STATES PATENT AND TRADEMARK OFFICE
CERTIFICATE OF CORRECTION

PATENT NO.         : 7,737,940 B2                                                                    Page 1 of 1
APPLICATION NO. : 11/846405
DATED              : June 15, 2010
INVENTOR(S)        : Jeng-fang Wu et al.

It is certified that error appears in the above-identified patent and that said Letters Patent is hereby corrected as shown below:

For the title, please replace "Touch-control liquid crystal display background of the invention" with "Touch-control liquid crystal display".

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,737,940 B2  
APPLICATION NO. : 11/846405  
DATED : June 15, 2010  
INVENTOR(S) : Jeng-fang Wu et al.

Page 1 of 1

It is certified that error appears in the above-identified patent and that said Letters Patent is hereby corrected as shown below:

Title Page, Item (54) and at Column 1, lines 1-3,
For the title, please replace "Touch-control liquid crystal display background of the invention" with "Touch-control liquid crystal display".

This certificate supersedes the Certificate of Correction issued December 14, 2010.

Signed and Sealed this
Fourth Day of January, 2011

David J. Kappos
*Director of the United States Patent and Trademark Office*